United States Patent [19]
Borax et al.

[11] 3,875,507
[45] Apr. 1, 1975

[54] POWER SUPPLY WITH AUTOMATIC SCALE CHANGING CAPABILITIES

[76] Inventors: Sigmund Borax, 6 Pickett Rd., Lincoln Park, N.J. 07035; Stanley Chait, 522 E. 85th St., New York, N.Y. 10028

[22] Filed: Dec. 26, 1973

[21] Appl. No.: 427,651

[52] U.S. Cl. ............................... 324/115, 324/131
[51] Int. Cl. ........................................... G01r 15/08
[58] Field of Search ............................ 324/115, 131

[56] References Cited
UNITED STATES PATENTS

| | | | |
|---|---|---|---|
| 2,517,638 | 8/1950 | Decker | 324/115 |
| 2,643,344 | 6/1953 | McLaren et al. | 324/115 |
| 3,016,488 | 1/1962 | Smith et al. | 324/115 |

*Primary Examiner*—Alfred E. Smith
*Assistant Examiner*—Ernest F. Karlsen
*Attorney, Agent, or Firm*—Stefan J. Klauber

[57] ABSTRACT

A power supply with automatic scale changing capabilities. The power supply includes a conventional electrical power source connectable to a load, and a current measuring instrument having a plurality of scales for measuring different ranges of load current. A switching means, such as a relay, is connected to switch among the several scales. The switching means is activated by a reed switch, the actuating coil for which is in series with the load or carries a current level proportional to that through the load. In consequence of such arrangement the reed switch is actuated and deactuated at a predetermined current through the load to, in turn, cause the first switching means to change instrument scales.

17 Claims, 3 Drawing Figures

POWER SUPPLY WITH AUTOMATIC SCALE CHANGING CAPABILITIES

BACKGROUND OF THE INVENTION

This invention relates generally to power supplies, and more specifically relates to power supplies including current measuring instruments having a plurality of scales associated therewith.

In numerous applications of power supplies, current measuring instruments are associated with the supply, so as to enable continuous or semi-continuous monitoring of the input to the power load. In electroplating environments, for example, careful attention must be accorded the current levels proceeding from the power supply to the power-absorbing load, whereby the power supplies utilized commonly include on a readily viewable face thereof, both a voltmeter, and an accurate, readily readable ammeter. In the case particularly of the ammeter, accurate reading requires that a plurality of scales be present thereon. Typically, for example, a pair of scales may thus run parallel to one another with a current ratio of, for example, 10:1 to 50:1 being present between the scales. So, for example, the first scale may indicate a current range of 1 to 10 amps, and the companion scale a range of 10 to 100 amps; or other combinations may be present, as for example, 1 to 50 amp on the one scale, and 50 to 2500 amps on the companion scale. By this type of arrangement one may simply read the needle position on the instrument against the appropriate scale to determine the current level.

In the past, simple and reliable means have not been present in instruments of the type indicated, for enabling switching from a first to a second scale upon the current reaching a desired change-over point. In numerous instances, for example, a scale-changing operation of this type, has simply been effected by manually changing scales when it becomes inconvenient to longer observe current ranges on the initially utilized scale. Although instruments, including ammeters, have in the past been known which include automatic or semi-automatic scale changing features, these have by and large been based upon relatively inefficient, complex and expensive techniques — none of which are fully acceptable for present purposes. Reference may be had in this connection for example, to the representative technique shown in U.S. Pat. No. 2,517,638, wherein opening and closing of a relay, the coil for which carries a current proportional to that to be measured, changes the resistance in the instrument circuit, as to effect the changes in the scale reading. Approaches such as these are inacceptable for the further reason, that in applications of the type considered in the present invention, the ratio of current ranges between scales is so large that unduly heavy relays would be necessary, which elements are expensive, cumbersome and inefficient.

A further important consideration, that renders the use of relays (as in the cited patent) unacceptable for present purposes, is the fact that the high magnetic mass present in these devices prevents automatic scale changing from occurring at a sharply defined point as the current rises — and upon the current returning to such point. In other words, there is a large "differential" resulting between the scale-changing point where current is increasing, and the scale-changing point where current is moving in a downward direction.

In accordance with the foregoing it may be regarded as an object of the present invention, to provide a power supply or the like, wherein means are present enabling automabic scale changing for the current measuring instruments associated therewith, which changing means are of simple and dependable construction, and respond accurately to a scale-changing requirement in both the increasing and decreasing directions of the measuring ranges.

It is a further object of the present invention, to provide automatic scale changing means for use in electrical power supplies of the like, which means may be simply and accurately calibrated by a manufacturer or user of the power supplies, so as to assure that the automatic scale changing occurs at a sharply predetermined point.

It is a still further object of the present invention, to provide automatic scale changing means which may be effectively utilized with AC or DC power supplies, meters or the like.

SUMMARY OF THE INVENTION

Now in accordance with the present invention, the foregoing objects and others as will become apparent in the course of the ensuing specification, are achieved in a power supply which includes a conventional electrical power source connectable to a load; and a current measuring instrument, such as an ammeter, having a plurality of scales for measuring the different ranges of load current. A first switching means, such as a relay, is connected to enable switching among the several instrument scales. This switching means is in turn, activated by a reed switch. The reed switch is actuated by a current-carrying means, which is in series with the load or is otherwise so connected as to carry a current proportional to the load current.

This current-carrying means is physically positioned with respect to the reed swtich so that the magnetic flux thereby generated may actuate the reed switch upon the load current reaching a sufficient level. The current-carrying means may thus comprise a coil which is wrapped about the reed switch in the conventional manner, or may comprise other elements in the power supply, such as choke coils or so forth. In consequence of the arrangement described, the reed switch is actuated and de-actuated at a predetermined current through the load to, in turn, cause the first switching means to change instrument scales. An RC circuit is preferably employed between the reed switch and first switching means, to reduce or eliminate the effect of indeterminate closing of the reed switch. Use of such an RC circuit also enables the principle of the invention to be applied to both AC and DC power supplies, and to other range-switching environments.

In accordance with a further aspect of the invention, the aforementioned reed switch enables accurate calibration, i.e. predetermined adjustment of the scale-changing point, by enabling adjustment of the flux linkage between the reed switch and its actuating coil. This may, for example, be effected by varying the respective positions of the reed switch and actuating coil; or in another embodiment of the invention, a second or biasing coil, may be associated with the reed switch, with current through the biasing coil being adjustably variable.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
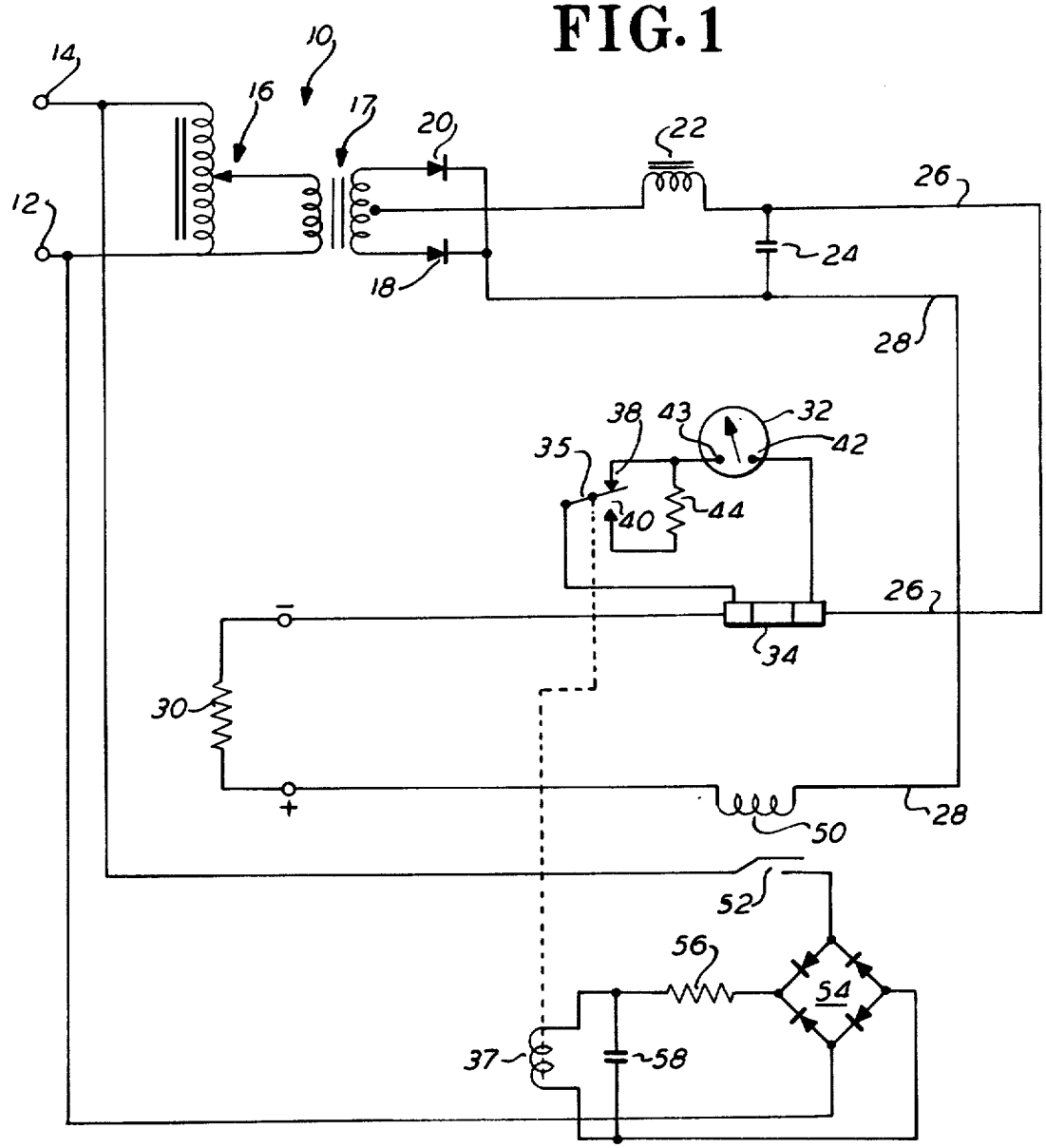
FIG. 1 is an electrical schematic diagram of a representative DC power supply in accordance with the present invention.

In FIG. 1 a simplified electrical schematic diagram appears, of a DC power supply 10 in accordance with the invention. Power supply 10 is connected to the usual AC mains, across input terminals 12 and 14. The supply 10 includes, as is conventional, a variable autotransformer 16 and power transformer 17, the output of which is provided through a pair of rectifier diodes 18, 20, thence through a filter-choke 22 and filter capacitor 24 to the output lines 26 and 28. The latter are then connected to a DC output load 30. For purposes of concretely illustrating the nature of the invention, such output load 30, may be representatively regarded as an electroplating apparatus — as for example the anode and cathode connections in a typical electroplating bath.

The output in line 26 to the DC load may include a current measuring instrument 32. Such instrument may be regarded for present purposes as an ammeter — which is actually connected in parallel with a shunt 34 in the line 26, so that a predetermined fraction of the load current enters the ammeter circuit. The current measuring instrument 32 is commonly a part of the power supply itself, i.e. may be mounted in the power supply cabinet so as to be directly observable by an operator using the power supply. In a typical instance, for example, such as that mentioned where the supply is furnishing power for an electroplating operation, the operator desires to closely observe and monitor the current flowing to the load. The operator further, frequently desires (by means not shown) to adjust the load current while observing instrument 32. In order to enable rapid and accurate reading of the instrument 32, it is thus common to include a plurality of overlying scales on the instrument. For example, the instrument dial face may include a lower range scale range for currents of 0 to 50 amps, and a higher scale range of 50 to 2500 amps. Thus in this example a ratio of 1:50 is present between the two ranges — but other ratios as known in the art can be present, as for example, 10:1, etc. Depending upon which scale is in use, the operator reads the position of the indicator needle on the one or other scale.

Switching between a pair of scales such as that discussed above, is accomplished by means of switch arm 35, which is actuated by a relay 37 as to be moved between contact points 38 and 40. In the position shown, the current by-passing shunt 34 passes directly to the input terminals 42 and 43 of instrument 32 — this state corresponding to the LOW range of the instrument. When arm 35 is in contact with point 40, the resistor 44 is placed in series with instrument 32. This latter position thus corresponds to the HIGH range of instrument 32. Of course, it will be understood in connection with the foregoing discussion, that illustration has been made for an instance when but two scales are present; however, a plurality of such scales may in fact be utilized, with a plurality of corresponding positions being provided for a contact arm 35 or other means which switches among various range resistors.

There is seen to be connected directly in series with output load 30, a coil 50. Coil 50 specifically comprises the actuating coil for a reed switch, schematically indicated at 52. Reed switch 52 per se is a conventional device, numerous types of which are well-known in the switching art. An illustration of such a device, for example, may be noted in U.S. Pat. No. 3,602,851. The coil 50 in the present instance is acutally wound about the external wall of the reed switch — as is customary in the use of reed switches — so that the magnetic field developed in consequence of current flow through coil 50, acts upon such field reaching a suitable intensity to close the normally opened reed switch 52.

Reed switch 52 is connected at the AC input mains as to control the application of AC potential to a full wave rectifying bridge 54. The output from bridge 54 is then seen to be provided to the pull-in relay 37, which is the relay including arm 35, previously referred-to. In accordance with the preferred construction of the present invention, there is provided between bridge 54 and relay 37, an RC circuit which includes resistors 56 and capacitor 58. The function of the RC circuit is one of preventing response to an indeterminate actuation of reed switch 52. In particular, it will be seen that any closing of reed switch 52 will begin to effect charging of capacitor 58 through the aforementioned bridge 54. The capacitor 58, however, may not discharge through the said bridge 54, because of the diode arrangement therein. Even though the reed switch may chatter back and forth as it reaches the transition point, it will therefore be clear that capacitor 56 will continue to charge until a level is reached at which sharp closing of pull-in relay 37 occurs. By the same token, activation of relay 37 will not occur until a threshold level of charge is reached. Conversely, when the charge level of capacitor 56 begins to drop, due to an open condition of reed switch 52, the relay will drop out sharply at a predetermined point.

Figure 2:
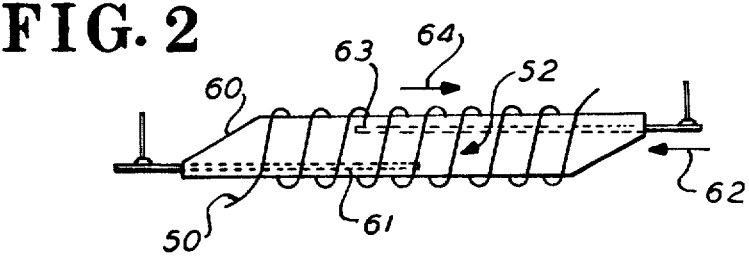
FIG. 2 is a schematic diagram, illustrating the manner in which the actuating coil for the reed switch used in the invention may be spatially adjusted with respect to said switch, as to vary the flux linkage.

In FIG. 2 a simplified schematic diagram is set forth illustrating the manner in which the actuating coil 50 for reed switch 52 may be adjusted with respect to said switch, as to vary the flux linkage. In particular there is thus shown in the Figure the envelope 60 of reed switch 52. Coil 50 is configured about envelope 60 as the usual helix — as is well-known by those familiar with the reed switch art. Current flowing through coil 50 produces a magnetic field which is particularly intense at axial points of the coil, whereby the reed switch contacts 61 and 63, which are responsive to the said field, are closed upon the current level reaching an appropriate point. In the present environment this mode of operation of the reed switch enables a number of simple techniques, by which the trip of the reed switch may be adjusted, to thereby enable calibration of the scale-switching point in the power supply. One of the simplest of these schemes involves effecting a relative axial displacement between actuating coil 50 and switch 52. This is schematically suggested in FIG. 2 by means of the arrows 62 and 64. By means of such relative axial displacement the envelope 60 of reed switch 52 can be moved from regions of higher magnetic field intensity to regions of diminished intensity. Various mechanisms may be utilized to effect the relative axial displacement; for example, switch 52 may be track-mounted as to be advanceable along an underlying track. Calibration is then simply affected in the power supply, by observing the meter scale as the indicator needle of instrument 32 approaches the point at which scale change should occur. Simultaneously, the relative positions of reed switch 52 and actuating coil 50 are manually adjusted so that the scale change occurs at the desired point. This operation may be carried out by the manufacturer during assembly of the power supply, or adjustments may be made by the user of a power supply — in order to assure that the instrument remains in calibration.

Since a reed switch is a low inertia device, the said switch will respond to an AC magnetic flux (at least at a 60 Hz rate), as well as to the DC-generated field discussed in connection with FIG. 1. In a further aspect of the present invention therefore, the current actuating coil for the reed switch may be placed in series with the AC current to the power supply. Under such conditions the reed responds to the alternating field and closes when the instantaneous current level reaches the magnitude required to develop a "pull-in" flux. Although the switch will open during the part of the cycle when the current is below that level, it will reclose during the following cycle. Where, however, an RC circuit, such as that described in connection with FIG. 1 is present, the capacitor portion of the RC current will charge during the closed periods. The capacitor voltage will therefore build to that required to actuate relay 37, after several reed switch close-and-open cycles. This same principle also renders the invention completely applicable to AC power supplies or other environments where a flowing AC current can be applied to the actuating coil.

Figure 3:
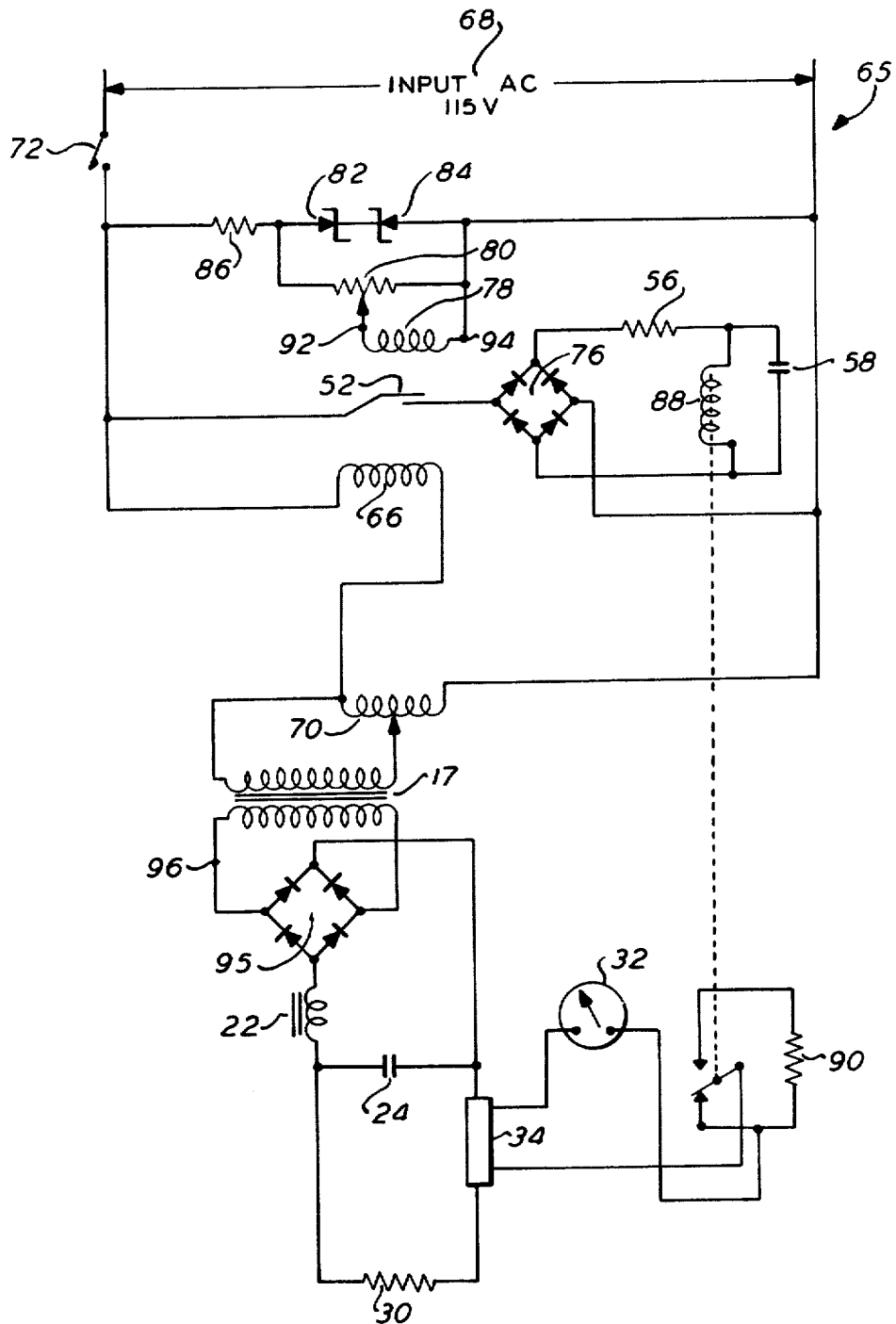
FIG. 3 is an electrical schematic diagram of a further embodiment of the invention; and also illustrates how a biasing coil may be employed to adjust the point at which scale changing occurs.

These and additional aspects of the present invention are illustrated in the electircal schematic diagram of FIG. 3. As seen therein, the actuating coil 66 is connected across the AC input 68, which is in turn provided to variable auto-transformer 70, similar to the corresponding element described in connection with FIG. 1. The power supply 65 shown in this Figure is actuated initially by closing of the switch 72, which enables the AC input. Reed switch 52 is connected in a manner similar to that previously described, that is to say, across the AC lines through a rectifier bridge 76, and an RC delay circuit, where the elements of the RC circuit are as already indicated in connection with FIG. 1, and are identified by corresponding reference numerals.

An important further aspect of the present invention is also set forth in FIG. 3. In particular, instead of using the single actuating coil 66, an additional bias, or reference coil 78 is employed, which acts to set up a "base" flux around the reed switch 52 and permits simple adjustment of the pull-in point, that is the scale-changing point, by simply changing the current level in the bias coil. The voltage to this coil is stabilized so as to make it independent of external voltage variations. The current in bias coil 78 may be either AC or DC, with substantially similar effect.

The advantages of employing an AC-actuated coil 66 and the additional bias or reference coil 78, are severalfold: in particular, the magnetizing (i.e. actuating) coil 66 may, in this arrangement, be placed in either the primary or secondary circuits of the power transformer 17, thus allowing convenience of winding the coil, as far as wire size, number of turns, etc. Thus while coil 66 is shown in FIG. 3 in the primary of transformer 17, it may e.g. be placed at point 96 in the secondary. The AC on the primary or secondary is proportional to the DC output of the rectifier 95, and may be calibrated to the DC value required. It should be appreciated here that the ripple output of the rectifier does not affect reed switch 52; therefore, the same calibration applies for different rectifier configurations, phases, degrees of filtering, and filtered ripple related to the current. For very high current power supplies a current transformer may be used to power coil 66, thus not restricting current levels where this device may be utilized.

This sort of arrangement shown in FIG. 2 may also be used to change scales for AC meters on AC switchboards, or AC power supplies, such as alternators. It is especially useful with AC metering to allow a low scale reading because of the logarithmic nature of AC volt and ammeters. The device may be used in conjunction with auxiliary relays to switch AC instrument current transformers, as well as voltage multipliers.

Utilizing the additional bias, or reference coil 78, a method is enabled to readily calibrate the precise set point on the power supply. This is of interest for the reasons previously discussed, as well as because reed switches vary, often widely, from switch to switch as far as their actuating characteristics are concerned, so that even two standard switches from the same manufacturer may actuate at different magnetizing current levels. By winding the bias coil 78 about switch 52, and actuating coil about this assembly, and by varying the bias current one may readily pre-set the precise point at which the switch will actuate due to the current flowing in coil 66. Therefore, one type of actuating coil will actuate a wide variety of switches, or one bias coil will allow an extended range of the power supply with one type or a variety of types of characteristics of the reed switch. The bias coil 78, either AC or DC, may either aid or oppose the actuating coil flux, thus widely extending the range of any particular type of actuating coil. Both the bias and actuating coils may be any combination of AC or DC. In the circuit of FIG. 3, the bias coil power supply is regulated against input line changes.

Continuing to refer to FIG. 3, bias coil 78 typically consists of a plurality of turns of fine wire so that a low bias current generates many ampere-turns, thus creating a biasing magnetic flux level. A biasing potentiometer 80 is adjustable to set the bias level. The voltage for potentiometer 80 is taken across a pair of zener diodes 82 and 84, thus stabilizing against input changes. Current to the zeners and potentiometer is limited by current-limiting resistor 86. The coil 66 which actuates reed switch 52 at a particular set point is adjusted by the amount of biasing flux. When capacitor 58 charges enough to actuate relay 88, resistor 90 is inserted in series with ammeter 32 to change the scale level in the manner previously discussed.

The connections 92 and 94 to biasing coil 78 may be reversed to generate a flux opposing the magnetizing flux of coil 66, thereby extending the level at which coil 66 may actuate reed switch 52. This extended level requires flux in coil 66 sufficient to overcome the opposing biasing flux of coil 80, and then enough beyond this to actuate switch 74; thus the range may be greatly extended by this approach.

In a typical circuit of the type shown in FIG. 3, the line voltage may be 115 volts, but relay 88 actuates at about 20 volts. Resistor 56 is therefore a relatively high resistance; much higher than the resistance of the reed switch when the latter is in an indeterminate resistance mode. By the latter phrase it is meant that when output current slowly increases in a ramp, the contacts of the reed switch may touch only lightly, thus causing some resistance in the switching circuit. However, this resistance is still only a small fraction of the resistance 56 and thus has little effect on the accuracy of the pull-in point of relay 88.

As an adjunct or alternative to the arrangements shown in FIGS. 1 and 3, a branch including a variable resistor may be placed in parallel with the reed switch coil, so as to selectively shunt current about the coil to control the amount of flux linked to switch 52.

While the present invention has been particularly set forth in terms of specific embodiments thereof, it will be appreciated by those skilled in the art, that numerous variations upon the invention are now enabled, which variations yet reside within the scope of the instant teaching. The present invention, for example, may be utilized in any environment where it is desirable to automatically actuate a relay switch at a specific current level (either AC or DC) for purposes of meter scale changing, and de-actuating when the current falls below the pre-set level. Thus for example, the invention has application to two rate battery chargers, or to power equipment where normal running current is much lower than starting current, and it is desired to monitor both automatically.

As has been previously mentioned, actuation of reed switch 52 need not be effected by current-carriers coiled about the switch. Rather, the reed switch may be appropriately positioned for activation by any member which carries a current in accordance with that proceeding to the load, provided that such member generates a magnetic field in the switch vicinity which is of sufficient magnitude to actuate such switch at the desired point of load current. Such member, may therefore, for example comprise choke coil 22 of FIG. 1, or depending upon the specific circuit arrangement, other current-carrying members of the circuit may be so used.

As is also well-known, the essential difference in design between ammeters and voltmeters arises from consideration of the effect of the instrument on the circuits in which it will be used. It therefore will be appreciated by those skilled in the art, that the term "current measuring instrument" as used herein, is intended to include voltmeters, as well as the ammeters — which have been specifically discussed for purposes of concrete illustration.

Accordingly, the present invention is broadly construed and limited only by the scope and spirit of the claims now appended hereto.

We claim:

1. A power supply with automatic scale changing capabilities comprising:
    an electrical power source, connectable to a load;
    a current measuring instrument connected for measuring the current to said load, said instrument having a plurality of scales for measuring different current ranges;
    first switching means for switching among said scales at said instrument;
    a reed switch connected to actuate said first switching means;
    current-carrying means connected to carry a current proportional to that through said load, said means being positioned with respect to said reed switch such that the magnetic field generated by said means is linked to said switch for actuating same, whereby said reed switch is actuated and de-actuated at a predetermined current through said load, to in turn actuate said first switching means to change said instrument scale; and
    an RC circuit means actuating the first switching means and responsive to actuation of the reed switch for reducing the effects of indeterminate closing at said reed switch.

2. Apparatus in accordance with claim 1, wherein said current-carrying means comprises at least a first coil.

3. Apparatus in accordance with claim 1, wherein said current measuring instrument comprises an ammeter.

4. Apparatus in accordance with claim 1, wherein said first switching means is a relay, current to the coil of which is controlled by said reed switch.

5. Apparatus in accordance with claim 2, including means to adjust the magnetic flux linked to said reed switch, to enable calibration of said power supply.

6. Apparatus in accordance with claim 5, wherein said adjusting means effects relative spatial displacement between said reed switch and said coil.

7. Apparatus in accordance with claim 5, further including an adjustable resistor beanch shunting said coil for enabling coarse adjustment during said calibration.

8. Apparatus in accordance with claim 1, wherein said reed switch electrically connects AC supply lines to said RC circuit; said RC circuit means including a full wave rectifying bridge, one side of which is connected across said AC lines through said switch, the opposite side of said bridge being connected across the capacitor for said RC circuit, and the output of said capacitor being provided to said first switching means.

9. Apparatus in accordance with claim 5, wherein said flux adjustment means includes a biasing coil magnetically linked to said reed switch, and means for adjusting the current flowing through said biasing coil, to thereby adjust the total magnetic flux linked to said reed switch from said biasing and first coils.

10. Apparatus in accordance with claim 9, wherein the electrical potential applied to said biasing coil is stabilized to render the said potential relatively independent of external voltage variations.

11. Apparatus in accordance with claim 4, wherein said first coil current is provided by an AC potential.

12. Apparatus in accordance with claim 11, wherein the input to said biasing coil is AC.

13. Apparatus in accordance with claim 2, wherein said power supply provides a DC output to said load; and wherein said first coil is in series with at least a portion of the current proceeding to said load.

14. Automatic scale changing apparatus, comprising in combination:
    a current measuring instrument connectable for measuring current to a load, said instrument having a plurality of scales for measuring different current ranges;
    first switching means for switching among said scales at said instrument;

a reed switch connected to actuate said first switching means;

current-carrying means connectable to carry a current proportional to that through said load, ssid means being positioned with respect to said reed switch such that the magnetic field generated by said means is linked to said switch for actuating same, whereby said reed switch is actuated and de-actuated at a predetermined current through said load, to in turn actuate said first switching means to change said instrument scale; and an RC circuit means actuating the first switching means and responsive to actuation of the reed switch for reducing the effects of indeterminate closing of said reed switch.

15. Apparatus in accordance with claim 14, wherein said current-carrying means includes at least a first coil.

16. Apparatus in accordance with claim 14, further including means to adjust the magnetic flux at said reed switch, to enable calibration of the point at which said scale changing is effected.

17. Apparatus in accordance with claim 16, wherein said flux adjustment means includes a biasing coil magnetically linked to said reed switch, and means for adjusting the current flowing through said biasing coil, to thereby adjust the total magnetic flux linked to said reed switch from said biasing and first coils.

* * * * *